United States Patent
Riddle et al.

(10) Patent No.: US 10,773,203 B2
(45) Date of Patent: Sep. 15, 2020

(54) TRANSITION GROUP METALS FOR THE CAPTURE OF RADIOACTIVE XENON

(71) Applicant: Energy, United States Department of, Washington, DC (US)

(72) Inventors: Catherine Riddle, Idaho Falls, ID (US); Dawn M. Scates, Idaho Falls, ID (US); Troy G. Garn, Idaho Falls, ID (US); Matthew G. Watrous, Idaho Falls, ID (US)

(73) Assignee: U.S. Department of Energy, Washington, DC (US)

( * ) Notice: Subject to any disclaimer, the term of this patent is extended or adjusted under 35 U.S.C. 154(b) by 139 days.

(21) Appl. No.: 15/716,955

(22) Filed: Sep. 27, 2017

(65) Prior Publication Data
US 2019/0091622 A1    Mar. 28, 2019

(51) Int. Cl.
| B01D 53/04 | (2006.01) |
| B01D 53/047 | (2006.01) |
| B01J 20/02 | (2006.01) |
| B01J 20/04 | (2006.01) |
| B01D 53/02 | (2006.01) |

(52) U.S. Cl.
CPC ....... *B01D 53/0407* (2013.01); *B01D 53/047* (2013.01); *B01D 53/0454* (2013.01); *B01D 53/0462* (2013.01); *B01J 20/0225* (2013.01); *B01J 20/0237* (2013.01); *B01J 20/0244* (2013.01); *B01J 20/0248* (2013.01); *B01J 20/04* (2013.01); *B01D 53/02* (2013.01); *B01D 2253/1122* (2013.01); *B01D 2256/18* (2013.01); *B01D 2257/11* (2013.01); *B01D 2259/40007* (2013.01)

(58) Field of Classification Search
CPC ................ B01D 53/02; B01D 53/0454; B01D 53/0462; B01D 53/047
USPC ..................................... 96/108, 131; 95/127
See application file for complete search history.

(56) References Cited

U.S. PATENT DOCUMENTS

| 2006/0130649 A1* | 6/2006 | Jain ...................... B01D 53/025 95/82 |
| 2009/0266232 A1* | 10/2009 | Nakamura ............. B01D 53/02 95/129 |
| 2012/0210872 A1* | 8/2012 | Duan ...................... B01J 20/22 95/127 |

* cited by examiner

*Primary Examiner* — Thuan D Dang
(74) *Attorney, Agent, or Firm* — Felisa L. Leisinger; Michael J. Dobbs; Brian J. Lally

(57) ABSTRACT

A xenon capture system that reduces the concentration of xenon in a carrier gas is disclosed. An example xenon capture system includes a carrier gas with a first concentration of xenon that flows through an intake into a chamber. Within the chamber is a reaction area that has at least one peripheral sidewall. The reaction area operates at a predetermined temperature, flow rate, and low pressure. Within the reaction area is at least one xenon capture mechanism that is at least partially formed of a transition metal. When the carrier gas is exposed to the xenon capture mechanism, the xenon capture mechanism adsorbs xenon from the carrier gas. The carrier gas, with a second concentration of xenon, exits the chamber through the exhaust outlet.

18 Claims, 6 Drawing Sheets

10,773,203 B2

TRANSITION GROUP METALS FOR THE CAPTURE OF RADIOACTIVE XENON

GOVERNMENT INTERESTS

The United States Government has rights in this invention pursuant to Contract No. DE-AC07-05ID14517, between the U.S. Department of Energy (DOE) and Battelle Energy Alliance.

FIELD OF THE INVENTION

The present invention relates to the capture of radioactive xenon using transition metals as the capture mechanism.

BACKGROUND OF THE INVENTION

The detection and capture of radioactive xenon is an important component world-wide for efforts in the detection of nuclear detonations and environmental management. Monitoring systems for nuclear detonations work better when radioactive xenon release from nonthreatening sources is mitigated. Nonthreatening releases of radioactive xenon include nuclear reactors and medical isotope production facilities during normal operations, lighting, scientific instruments, and anesthesia. Therefore, capturing radioactive xenon emissions from nonthreatening emissions unmasks the xenon emissions from nuclear detonations. There is significant world-wide interest in distinguishing nonthreatening radioactive xenon releases from a nuclear detonation. The emissions of radioactive xenon from these nonthreatening sources not only interfere with monitoring agencies ability to detect a nuclear detonation, but also negatively impact the environment.

Prior art techniques to capture xenon include absorbents made from silver-loaded zeolites, using activated carbon, metal-organic frameworks and porous organic cage compounds. These methods are costly and inefficient. Therefore, there is a need for a more efficient and cost-effective xenon capture system.

SUMMARY OF THE INVENTION

According to one aspect of the invention, a xenon capture system reduces the concentration of xenon in a carrier gas. The system has a carrier gas with a first concentration of xenon that flows through an intake into a chamber. Within the chamber is a reaction area that has at least one peripheral sidewall. The reaction area operates at a predetermined temperature, rate of gas flow at ambient pressure and at low pressures. Within the reaction area is at least one xenon capture mechanism that is at least partially formed of a transition metal. When the carrier gas is exposed to the xenon capture mechanism, the xenon capture mechanism adsorbs xenon from the carrier gas. The carrier gas, with a second concentration of xenon, exits the chamber through the exhaust outlet.

BRIEF DESCRIPTION OF THE DRAWINGS

Embodiments of the present invention are illustrated in the accompanying figures where.

DETAILED DESCRIPTION OF THE INVENTION

Figure 1:
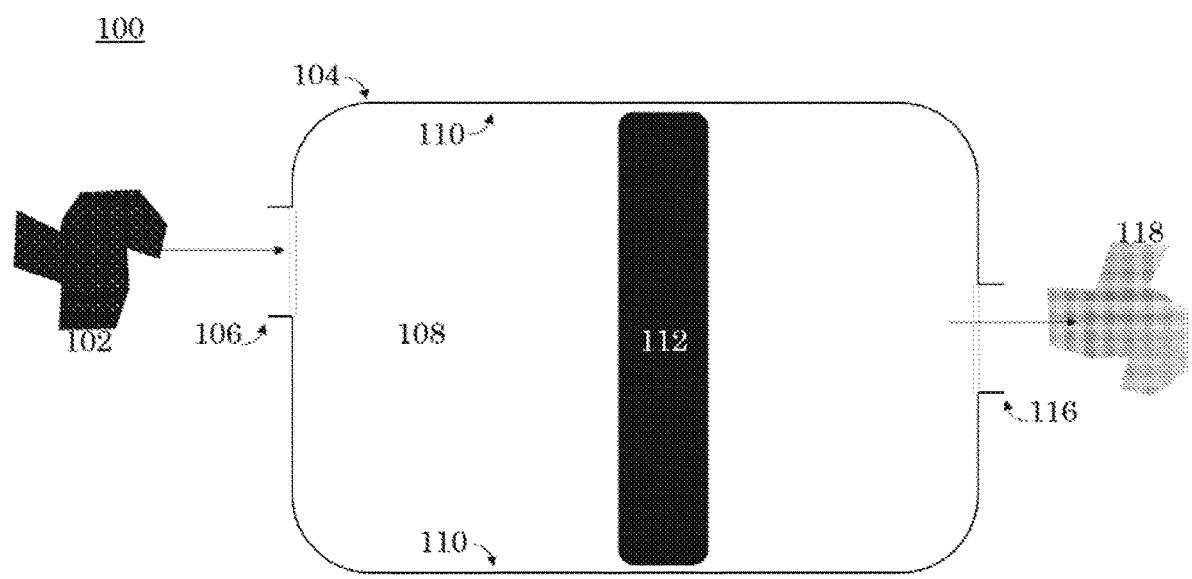
FIG. 1 is a front orthogonal view of a xenon capture system for reducing the concentration of xenon in a carrier gas according to an embodiment of the invention.

The present invention generally relates to a xenon capture system 100 for reducing the concentration of xenon in a carrier gas having a first concentration of xenon 102. Referring to FIG. 1, the xenon capture system 100 has a carrier gas having a first concentration of xenon 102 and a chamber 104. The xenon capture system 100 can easily be scaled up or down by adding more reaction areas to accommodate larger quantities of carrier gas, and vice versa. In an embodiment, the carrier gas 102 is inert, preferably argon, helium, or nitrogen gases. In other embodiments the carrier gas 102 is any gas that produces satisfactory results. The chamber 104 has a reaction area 108 defined by at least one peripheral sidewall 110. In an embodiment, the at least one peripheral sidewall 110 is one sidewall that forms a cylinder. In an alternate embodiment, the at least one peripheral sidewall 110 is six sidewalls that form a cube. In further embodiments, the peripheral sidewall 110 can be any shape that allows for the capture of xenon.

The carrier gas 102 enters the chamber 104 at the intake 106. The intake 106 is operatively connected to the reaction area 108 such that the carrier gas 102 flows from the intake 106 to the chamber 104. The carrier gas 102 enters the reaction area 108. The present invention, unlike prior art, requires less reaction area 108 to accomplish the same efficiencies of xenon capture as prior art systems. Prior art systems, which require larger reaction areas to accommodate HZ-PAN (Hydrogen form Mordenite-Polyacrylonitrile) sorbent, AgZ-PAN (Silver converted form Mordenite-Polyacrylonitrile) sorbent, and metal organic frameworks and cryogenic separations to solidify and capture xenon. Instead, the present invention requires a smaller reaction area meaning it is more efficient, more environmentally friendly, and less expensive.

The reaction area 108 has a predetermined temperature and a rate of flow. The temperature and flow are selected based upon the xenon capture rate necessitated by the xenon capture mechanism's 112 material makeup. In an embodiment, the reaction area 108 has a temperatures ranging from approximately −77° C. up to 25° C. In another embodiment, the xenon capture system 100 operates in temperature swing adsorption. That is, the reaction area 108 has a temperature that increases or decreases as the carrier gas 102 flows from the intake 106 into the reaction area 108. The temperature change causes the xenon capture mechanism 112 to adsorb xenon. In an embodiment, the reaction area 108 has an ambient flow rate of 0.25 L/min to 2 L/min with an overpressure release at 50 psi. In an embodiment, the xenon capture system 100 operates in a flow rate adjustable adsorption. That is, the reaction area 108 has a xenon capture rate that increases or decreases as the carrier gas 102 flows from the intake 106 into the reaction area 108. The varied flow volume and rate change causes the xenon capture mechanism 112 to adsorb xenon. In another embodiment, the xenon capture system 100 operates in temperature swing adsorption and pressure swing adsorption.

Within the reaction area 108, the carrier gas 102 is exposed to at least one xenon capture mechanism 112. The at least one xenon capture mechanism 112 is at least partially formed of a transition metal or combinations thereof. A transition metal is any of the set of metallic elements occupying a central block (Groups IVB-VIII, IB, and IIB, or 4-12) in the periodic table, e.g., iron, manganese, chromium, and copper. Preferably, the at least one xenon capture mechanism 112 is at least partially formed of An, Ni, Zn, Al, Cu, Ti, or Mg, or a combination or alloy thereof. Preferably, the xenon capture mechanism will be resistant to corrosion. In an embodiment, the at least one xenon capture mechanism 112 is stainless steel. Preferably, the xenon capture mechanism 112 is a stainless steel mixture of Ni or Mg+16% Cr. In an embodiment, the at least one xenon capture mechanism 112 is a transition metal amalgam including An, Ni, Zn, Al, Cu, Ti, or Mg. The composition of the at least one xenon capture mechanism 112 can be selected to accommodate operating in temperature swing adsorption or flow rate adsorption or a combination of both.

Unlike the prior art xenon capture systems, the use the xenon capture mechanism 112, as in the present invention, eliminates the threat of catastrophic events such as fire, explosion, asphyxiation associated with the prior art's necessary temperature changes with cryogenic capture techniques to effectuate xenon capture. Additionally, because transition metals are readily available and do not have market driven costs, the present invention is less expensive and more market stable. Transition metals are more environmentally friendly and do not require specialized disposal. Unlike the prior art, the xenon capture mechanism 112 of this invention is durable, inexpensive, non-hazardous, non-flammable, non-explosive given temperature fluctuations, and corrosion resistant.

The xenon capture mechanism 112 is disposed within the reaction area 108 such that when the carrier gas 102 is exposed to the xenon capture mechanism 112, the xenon capture mechanism 112 removes xenon from the carrier gas 102 such that a carrier gas having a second concentration of xenon 118 is created. The first concentration of xenon in the carrier gas 102 is less than the second concentration of xenon in the carrier gas 118. The carrier gas having a second concentration of xenon 118 is released at the exhaust outlet 116. The exhaust outlet 116 and the reaction area 108 are operatively link such that the carrier gas having a second concentration of xenon 118 flows from the reaction area 108 to the exhaust outlet 116. In an embodiment, the exhaust outlet 116 flows into a holding tank. The xenon capture mechanism 112 removes xenon from the carrier gas 102 through physical adsorption processes. The present invention, which uses physical adsorption, is preferential over prior art methods, including cryogenic distillation, due to the prior art's high capital costs, high energy consumption, necessary decontamination efforts, and potential ozone explosion hazards.

In an embodiment the at least one xenon capture mechanism 112 discharges the captured xenon using temperature swing adsorption, flow rate adsorption or pressure swing adsorption or a combination of all. The discharged captured xenon can be reused for commercial purposes or stored until it has decayed for release. In an embodiment, the reaction area 108 selectively discharges other compounds associated with xenon capture. Other compounds associated with xenon capture can include fission gas products. In another embodiment, the other compounds associated with xenon capture are released individually, in combination with other compounds associated xenon capture, or in combination with the carrier gas having a second concentration of xenon 118.

In an embodiment the at least one xenon capture mechanism 112 is reusable. Unlike prior art, which must be replaced regularly, the ability to reuse the xenon capture mechanism 112 means no physical contact with the xenon capture system 100 is necessary. Additionally, reusable xenon capture mechanisms 112 are more environmentally beneficial due to their unlimited recycle capacity.

In an embodiment the at least one xenon capture mechanism 112 is used in an existing xenon capture chamber to replace prior art charcoal filters. The existing charcoal filters would be replaced with at least one xenon capture mechanism 112 of the present invention. Retrofitting prior art xenon capture chambers would require only minor changes and is not cost prohibitive to implementing the novelties of the present invention. Implementing the present invention within existing chambers will convert prior art existing chambers into simpler, less dangerous chambers and they will be less expensive to operate.

To demonstrate that it is possible, according to the invention, to have a xenon capture mechanism 112 at least partially formed of a transition metal, an experiment was performed. In the experiment, the xenon capture mechanism 112 was a highly polished, stainless steel mesh holding approximately 2 grams of charcoal. Carrier gas 102 entered the reaction area 108 with a first concentration of xenon, and was exposed to the xenon capture mechanism 112. The carrier gas 118 had a second concentration of xenon at the exhaust outlet 116. Detection showed a measurable amount of xenon was captured not by the charcoal, but in the stainless steel mesh screen of the xenon capture mechanism 112.

Figure 2:
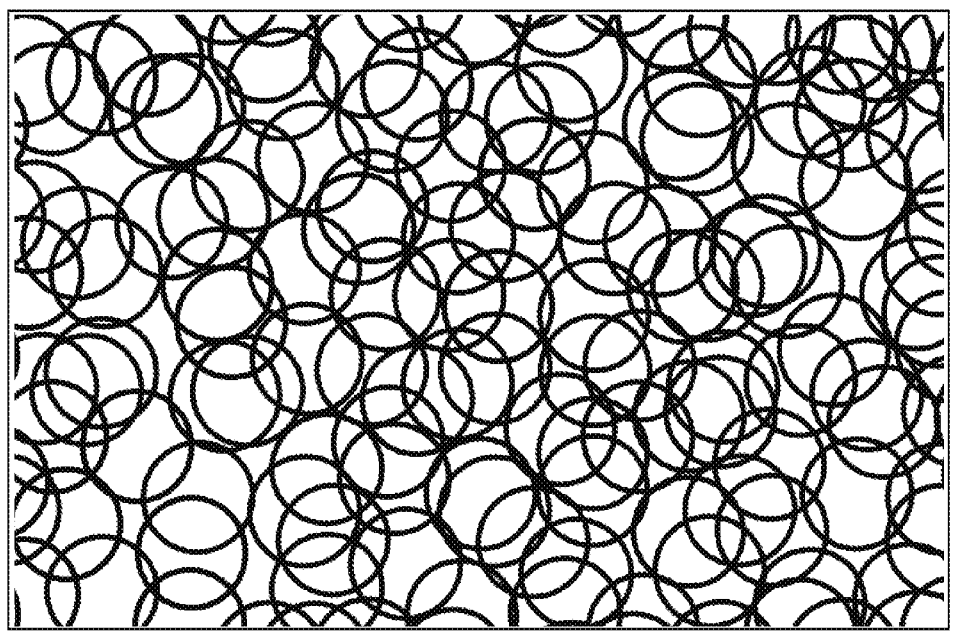
FIG. 2 is a detail view of the xenon capture mechanism according to a second embodiment of the invention.
Figure 3:
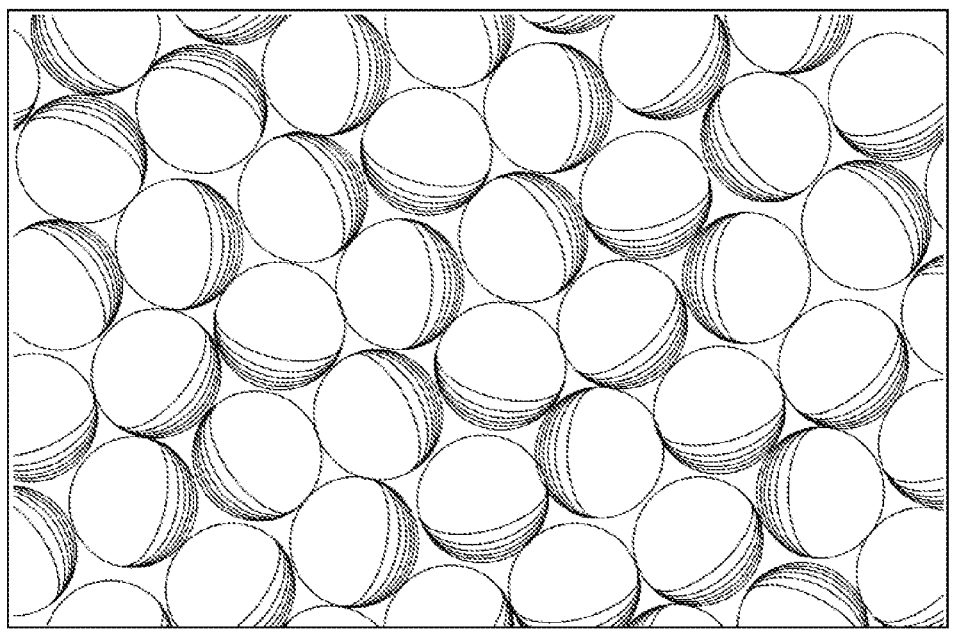
FIG. 3 is a detail view of the xenon capture mechanism according to a third embodiment of the invention.
Figure 4:
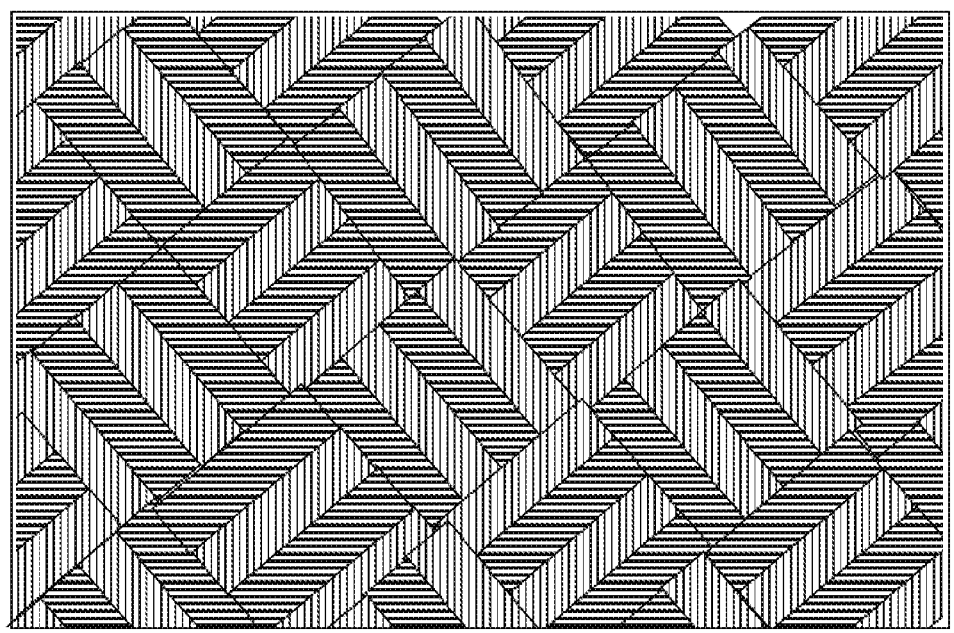
FIG. 4 is a detail view of the xenon capture mechanism according to a fourth embodiment of the invention.
Figure 5:
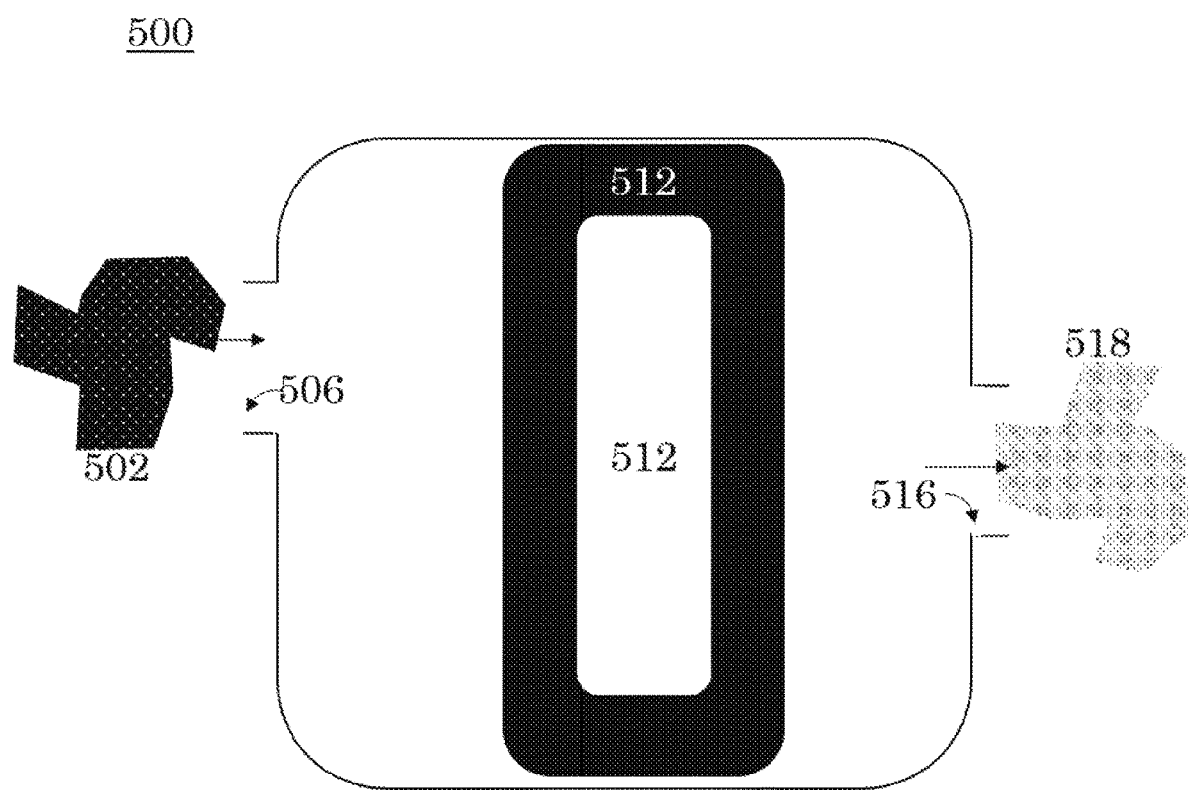
FIG. 5 is a front orthogonal view of the xenon capture system according to a fifth embodiment of the invention.

In an embodiment, the xenon capture mechanism 112 is a metal sponge, as shown in FIG. 2; metal pellets, as shown in FIG. 3; a metal mesh, as shown in FIG. 4. In an embodiment, the xenon capture mechanism 112 is a combination of two or more of a metal sponge, metal pellets, or metal mesh. The different configurations of xenon capture mechanisms 112 can be used to satisfy different carrier gas flow or xenon capture rates. In an embodiment, the xenon capture system 100 has a controller configured to manage the flow of the carrier gas 102 through the system 100 in a predetermined manner Referring to FIG. 5, in an embodiment, the xenon capture mechanisms 512 are arranged in series. A carrier gas having a first concentration of xenon 502 passes through the intake 506 into the xenon capture mechanisms 512. The xenon capture mechanisms 512 are arranged in series. After passing through the xenon capture mechanisms 512 arranged in series, the carrier gas having a second concentration of xenon 518 leaves the xenon capture system 500 through the exhaust outlet 516.

Figure 6:
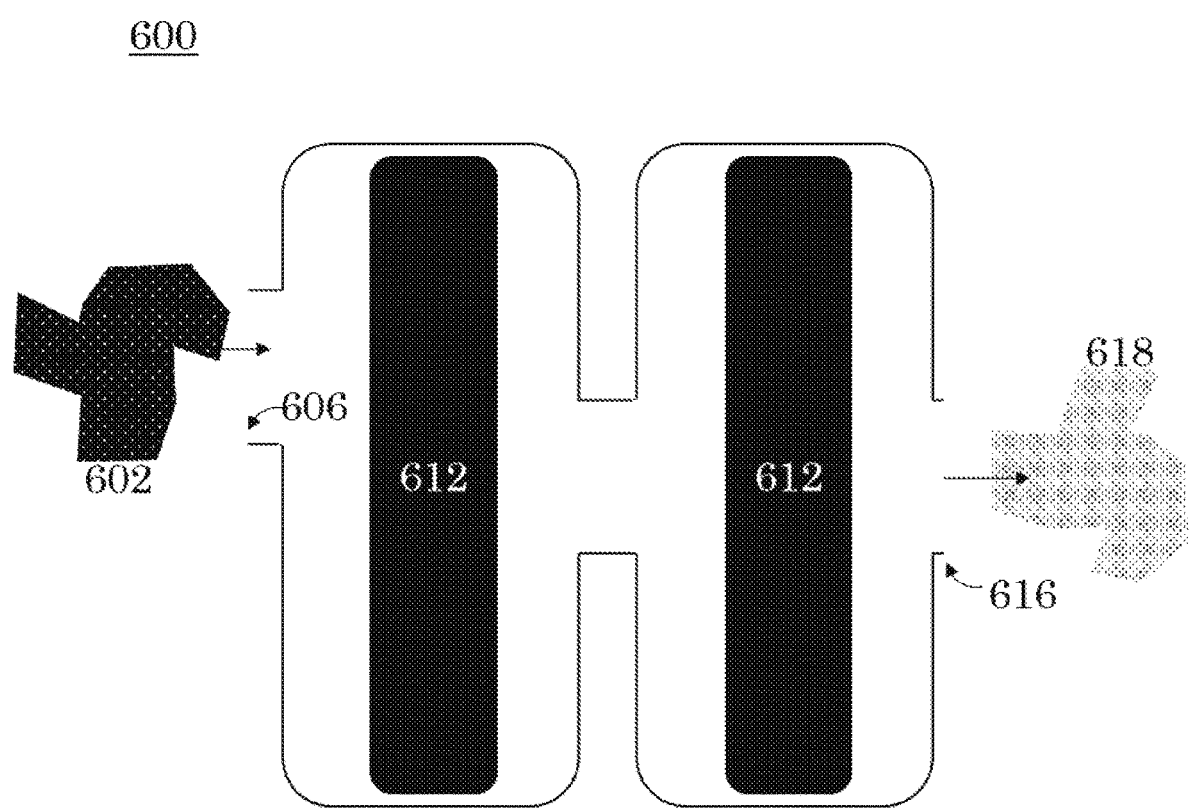
FIG. 6 is a front orthogonal view of the xenon capture system according to a sixth embodiment of the invention.

Referring to FIG. 6, in an embodiment, the xenon capture mechanisms 612 are arranged in tandem. A carrier gas having a first concentration of xenon 602 passes through the intake 606 into the xenon capture mechanisms 612. The xenon capture mechanisms 612 are arranged in tandem. After passing through the xenon capture mechanisms 612 arranged in tandem, the carrier gas having a second concentration of xenon 618 leaves the xenon capture system 600 through the exhaust outlet 616.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

All publications and patent documents cited in this application are incorporated by reference in their entirety for all purposes to the same extent as if each individual publication or patent document were so individually denoted.

Any element in a claim that does not explicitly state "means for" performing a specified function, or "step for" performing a specific function, is not to be interpreted as a "means" or "step" clause as specified in 35 U.S.C. § 112, ¶ 6. In particular, the use of "step of" in the claims herein is not intended to invoke the provisions of 35 U.S.C. § 112, ¶ 6.

The invention claimed is:

1. A xenon capture system for reducing the concentration of xenon in a carrier gas, the system comprising:
   a carrier gas, the carrier gas having a first concentration of xenon;
   a chamber, the chamber having an intake for receiving the carrier gas and an exhaust outlet for discharging the carrier gas;
   a reaction area defined by at least one peripheral sidewall, the reaction area having a temperature between approximately −77° C. and 25° C., flow rate and pressure, the intake and the reaction area operatively linked with each other, the exhaust outlet and the reaction area operatively linked with each other; and
   at least xenon capture mechanism formed from at least one elemental transition metal, the at least one xenon capture mechanism disposed within the reaction area such that when carrier gas is exposed to the at least one xenon capture mechanism, the at least one xenon capture mechanism adsorbs xenon from the carrier gas such that the carrier gas has a second concentration of xenon at the exhaust outlet.

2. The xenon capture system of claim 1, wherein said at least one xenon capture mechanism is a metal sponge.

3. The xenon capture system of claim 1, wherein said at least one xenon capture mechanism is at least one metal pellet.

4. The xenon capture system of claim 1, wherein said at least one xenon capture mechanism is a metal mesh.

5. The xenon capture system of claim 1, wherein said xenon capture mechanism releases xenon at a predetermined time.

6. The xenon capture system of claim 1, wherein two or more xenon capture mechanisms are arranged in series.

7. The xenon capture system of claim 1, wherein two or more xenon capture mechanisms are arranged in tandem.

8. The xenon capture system of claim 1, wherein said predetermined pressure is less than 50 psi.

9. The xenon capture system of claim 1, wherein said predetermined flow rate is between 0.25 L/min and 2 L/min.

10. The xenon capture system of claim 1, wherein said xenon capture system operates in temperatures swing adsorption.

11. The xenon capture system of claim 1, wherein said xenon capture system operates in low pressure swing adsorption.

12. The xenon capture system of claim 1, wherein said xenon capture system operates in temperature swing adsorption, flow rate adsorption, and pressure swing adsorption.

13. The xenon capture system of claim 1, wherein said carrier gas is inert.

14. The xenon capture system of claim 1, wherein said carrier gas is argon, helium, or nitrogen.

15. The xenon capture system of claim 1, wherein said exhaust feeds into a holding tank.

16. The xenon capture system of claim 1, additionally comprising a controller configured to manage the flow of the carrier gas through the system in a predetermined manner.

17. The xenon capture system of claim 1, wherein said at least one xenon capture mechanism is formed from elemental nickel (Ni) or zinc (Zn) or copper (Cu) or aluminum (Al) or magnesium (Mg) or a combination of one or more of elemental nickel, zinc, copper, aluminum, or magnesium.

18. The xenon capture system of claim 1, wherein said at least one xenon capture mechanism is formed from elemental nickel (Ni) or zinc (Zn) or copper (Cu) or aluminum (Al) or magnesium (Mg) or an alloy of one or more of elemental nickel, zinc, copper, aluminum, or magnesium.

* * * * *